United States Patent
Herzberg et al.

(10) Patent No.: US 6,813,611 B1
(45) Date of Patent: Nov. 2, 2004

(54) CONTROLLING, CONFIGURING, STORING, MONITORING AND MAINTAINING ACCOUNTING OF BOOKKEEPING INFORMATION EMPLOYING TREES WITH NODES HAVING EMBEDDED INFORMATION

(75) Inventors: Louis Paul Herzberg, Monsey, NY (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 09/590,205

(22) Filed: Jun. 8, 2000

Related U.S. Application Data (60) Provisional application No. 60/138,172, filed on Jun. 8, 1999.

(51) Int. Cl.[7] .............................................. G06F 17/00
(52) U.S. Cl. ......................................... 705/30; 345/440
(58) Field of Search .............................. 705/30; 345/440

(56) References Cited

U.S. PATENT DOCUMENTS

| | | | | |
|---|---|---|---|---|
| 5,119,318 A | * | 6/1992 | Paradies et al. ............... | 706/52 |
| 5,265,244 A | * | 11/1993 | Ghosh et al. ................... | 707/1 |
| 5,315,710 A | * | 5/1994 | Kishimoto et al. .......... | 717/107 |
| 5,587,930 A | * | 12/1996 | Hori et al. .................... | 702/185 |
| 5,752,243 A | * | 5/1998 | Reiter et al. .................... | 707/3 |
| 5,805,881 A | * | 9/1998 | Kiuchi et al. .................. | 705/30 |
| 5,819,249 A | * | 10/1998 | Dohanich et al. .............. | 706/46 |
| 5,999,192 A | * | 12/1999 | Selfridge et al. ............ | 345/440 |
| 6,301,579 B1 | * | 10/2001 | Becker ........................ | 345/440 |
| 6,549,673 B1 | * | 4/2003 | Ammicht et al. ........... | 382/240 |

FOREIGN PATENT DOCUMENTS

| | | | |
|---|---|---|---|
| GB | 2196764 | * | 5/1988 |
| GB | 2254522 A | * | 7/1992 |

OTHER PUBLICATIONS

"New for PC: VisiNET Live Network Management", Newsbytes News Network, Apr. 16, 1991.*

* cited by examiner

*Primary Examiner*—F. J. Bartuska
(74) *Attorney, Agent, or Firm*—Scully, Scott, Murphy & Presser; Louis P. Herzberg (57) ABSTRACT

A method and system for providing multilevel information about aspects of accounting. The method comprises the steps of generating a display, on a computer display screen, of a tree having a plurality of nodes, and embedding in the nodes multilevel information about said accounting aspects. For example, trees may be generated that represent credit, debit, revenue, expense, credit and/or debit plans, credit or debit thresholds, assets (cash, investments, receivables), inventory costing and control, short term and/or long term liabilities (stocks, bonds, mortgage notes), stockholders (equity, dividends, cost basis, restrictions, donations), working capital, cash flow (income statement, operations, earnings, forecast, historical data), customer data, manufacturing costs (processing, target), profit (product, division) taxes (income, sales, real estate, etc.). Information may be embedded with a matrix approach. As examples, matrices may be used that contain cost accounting information for a catalog of elements of products with a catalog of subsystem, matrices may be used that provide particular bookkeeping and accounting requirements, and matrices may be used that represent corporate accounting firms.

29 Claims, 6 Drawing Sheets

|  | Power Supplies | Circuit Boards | Cooling | Frames & Covers |
|---|---|---|---|---|
| TVs - 21" |  |  |  |  |
| AM & FM Radios |  | Intersection of element 2 and element 2 ~3003 |  |  |
| Can openers |  |  |  |  |

3000 — table
3001 — Catalogs of {Products}
3002 — Catalogs of {Suppliers}

Figure 4

|  | Main Circuit Board | Tuner Boards | Power Supply Board | Display Board |
|---|---|---|---|---|
| AM Radio Model 1 | $47.12 | $15.91 | $2.31 | $0 |
| FM Radio Model 3 | $51.12 | $37.19 | $2.61 | $0 |
| Combined AM & FM Radio | $62.99 | $41.17 | $2.61 | $7.34 |

Catalogs of {Circuit Boards} — 3102
Catalogs of {AM/FM Radios} — 3101
3100
3103

CONTROLLING, CONFIGURING, STORING, MONITORING AND MAINTAINING ACCOUNTING OF BOOKKEEPING INFORMATION EMPLOYING TREES WITH NODES HAVING EMBEDDED INFORMATION

CROSS REFERENCE

This application claims priority from U.S. Provisional Application No. 60/138,172, filed on Jun. 8, 1999.

This application is also related to the following copending applications, filed herewith,
Ser. No. 60/138,172, "Control And Maintenance Of Multicast Distribution Employing Embedded Displays,"
Ser. No. 09/590,323, "Method Of Control, Maintenance And Allocation Of Computer Server Farms Resources And Other Resource Farms To Their Users,"
Ser. No. 09/590,203, "Video-On-Demand configuring, Controlling And Maintaining,"; and
Ser. No. 09/590,206, "Doing Business Employing Linked Trees Having Retrievable Embedded Information, now U.S. Pat. No. 6,647,394";

which are all incorporated herein by reference in entirety.

This application is also cross referenced with copending application Ser. No. 09/327,708, entitled, "Representing, Configuring, Administering, Monitoring, and/or Modeling Connections Using Catalogs and Matrixes," by E. H. Booth et al., filed Jun. 8, 1999, the disclosure of which is incorporated herein by reference in entirety;

The disclosure of this application is related to the disclosures of the following U.S. Patents:

U.S. Pat. No. 5,289,460, "Maintenance of Message Distribution Trees in a Communications Network," by Drake, Jr. et al., issued Feb. 22, 1994;
U.S. Pat. No. 5,724,646, "Fixed video-on-demand," by A. Ganek et al., issued Mar. 3, 1998;
U.S. Pat. No. 5,682,597, "Hybrid Video-on-demand Based on a Near-video-on-demand System," by A. Ganek et al., issued Oct. 28, 1997;
U.S. Pat. No. 5,459,725, "Reliable Multicasting over Spanning Trees in Packet Communications Networks," by Bodner, R. A. et al., issued Oct. 17, 1995;
U.S. Pat. No. 4,277,837, "Personal Portable Terminal for Financial Transactions," by Stuckert, P. E., issued Jul. 7, 1981;
U.S. Pat. No. 4,106,667, "Apparatus and Method for Conducting Financial Transactions," by Lynott, J. J., issued Aug. 15, 1978;

which are all incorporated herein by reference in entirety.

BACKGROUND OF THE INVENTION

This invention generally relates to accounting; and, more specifically, the invention relates to the use of computer displays having accounting information embedded therein.

There are many separate applications to satisfy the many facets and aspects of accounting. It would be highly advantageous to have a single application which enables the display of the broad array of aspects.

SUMMARY OF THE INVENTION

An aspect of this invention is to provide a displayable tree configuration for each of a plurality of accounting aspects.

Another aspect of the present invention is to provide a displayable tree configuration having a plurality of nodes, and to embed in each node levels of information useful for a specific accounting aspect or attributes.

These and other aspects are attained with a method and system for providing multilevel information about aspects of accounting. The method comprises the steps of generating a display, on a computer display screen, of a tree having a plurality of nodes, and embedding in the nodes information about said accounting aspects. For example, trees may be generated that represent credit, debit, revenue, expense, credit and/or debit plans, credit or debit thresholds, assets (cash, investments, receivables), inventory costing and control, short term and/or long term liabilities (stocks, bonds, mortgage notes), stockholders (equity, dividends, cost basis, restrictions, donations), working capital, cash flow (income statement, operations, earnings, forecast, historical data), customer data, manufacturing costs (processing, target), profit (product, division), taxes (income, sales, real estate, etc.).

Information may be embedded with a matrix approach. As an example, matrices may be used that contain cost accounting information for a catalog of elements of products with a catalog of subsystems. Matrices may be used that provide particular bookkeeping and accounting requirements, and matrices may be used that represent corporate accounting firms.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
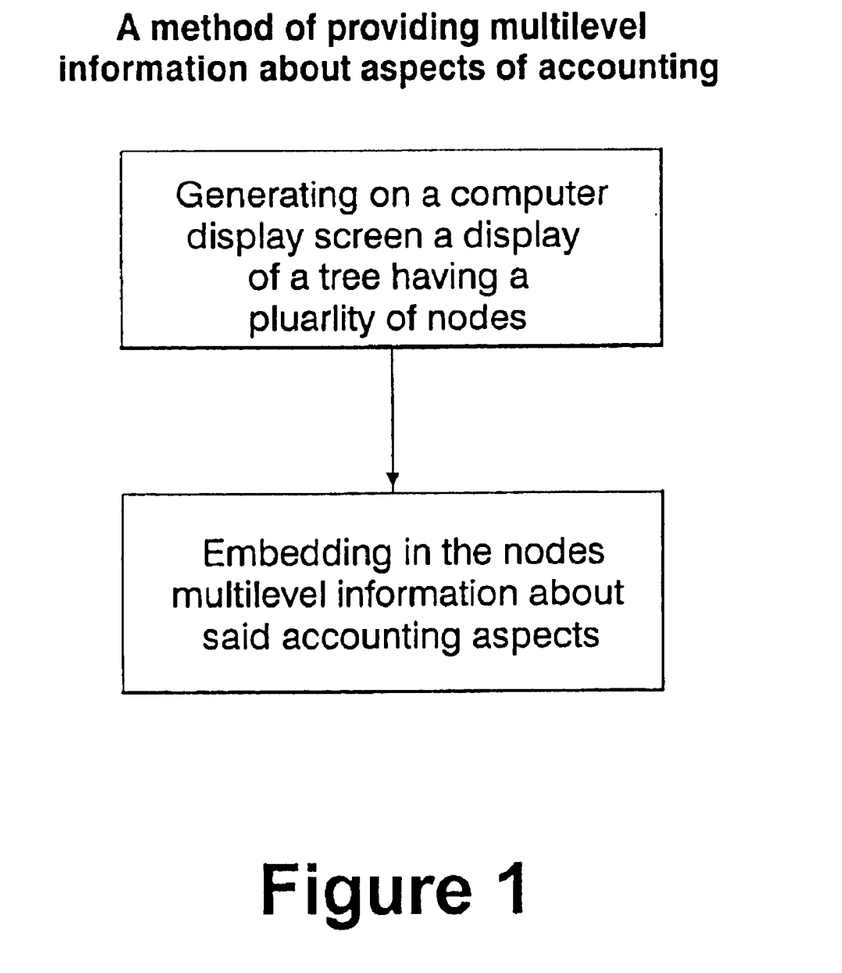
FIG. 1 is a flow chart outlining a preferred method embodying this invention.
Figure 2:
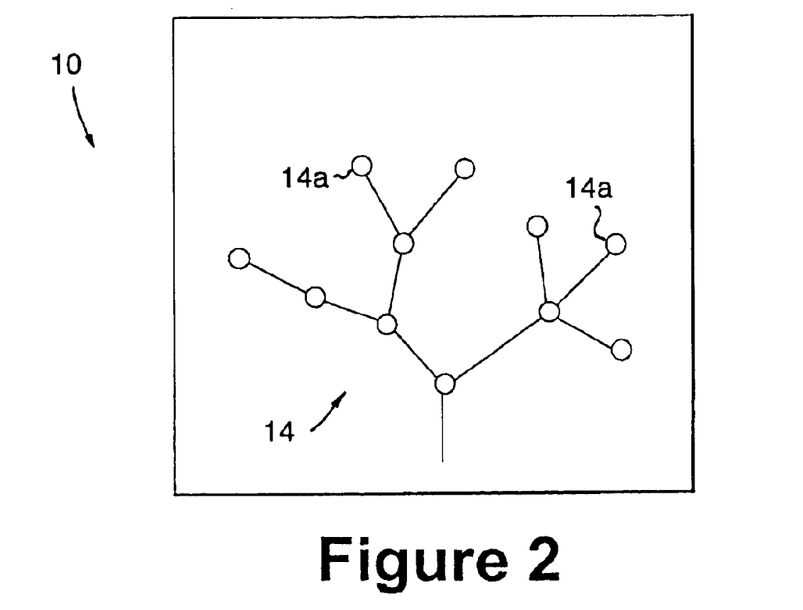
FIGS. 2 and 3 show displays of trees having nodes with embedded information.
Figure 3:
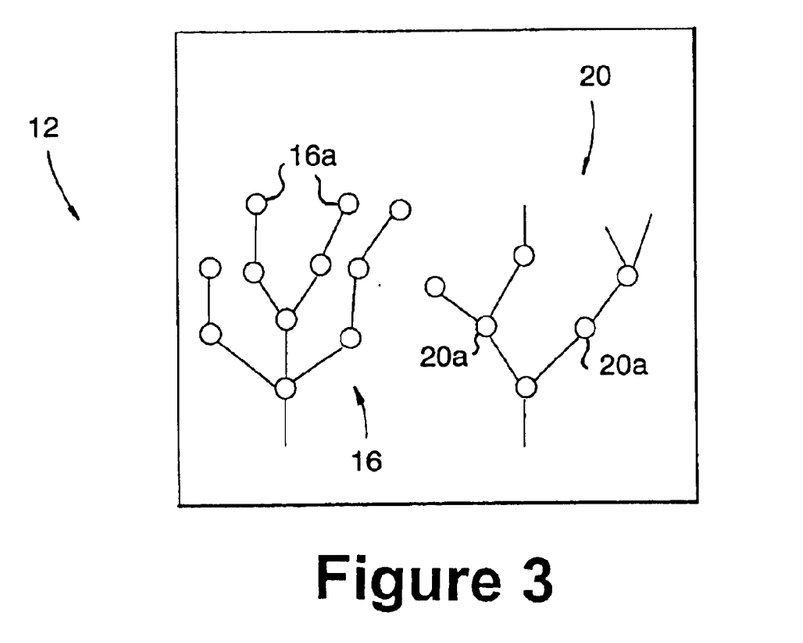

With reference to FIGS. 1–3, this invention provides a display 10, 12 showing a tree configuration 14, 16, 20 for each of a plurality of accounting embodiments. Each tree includes nodes 14a, 16a, 20a that represent members making up the tree. The nodes are all capable of having many levels of embedded information useful for its specific accounting embodiments or attributes. The embedded information is accessible for display by a user having viewing and/or other rights to the specific level of information.

Although the trees in FIGS. 2 and 3 are shown bottom up (extending upward from the root node), trees may similarly be formed and/or displayed top down (extending downward from the root node), sideways (from the root node) or in any combination of these (as known to those skilled in the art).

The particular tree formation and/or display is formed as is best suited to the particular application and/or display, and in accordance with the desire of a viewer or user. In some embodiments these display variations are selectable by the user. When more than one tree is displayed (e.g. in a split screen utilization), each tree may be formed and/or displayed in a different form/shape.

Thus, individual trees may be formed for credit, debit, revenue, expense, credit and/or debit plans, credit or debit thresholds, assets (cash, investments, receivable), inventory costing and control, short term and/or long term liabilities (stocks, bonds, mortgage notes), stockholders (equity, dividends, cost basis, restrictions, donations), working capital, cash flow (income statement, operations, earnings, forecast, historical data), customer data, manufacturing costs (processing, target), profit (product, division), taxes (income, sales, real estate, etc.).

In another embodiment, as particularly shown in FIG. 3, various trees are link-able and displayable with each other. In a further embodiment, various trees are formed and made displayable for data retrieved from internal, commercial and/or industrial databases. In still another embodiment, various trees are link-able and displayable with trees and/or data retrieved from internal, commercial and/or industrial databases.

In another embodiment, a tree may contain nodes for each customer. The nodes would include embedded data on the credit healthfulness of each of the customers. Information is periodically received from financial databases (e.g. Dun & Bradstreet) which are linked to determine, store and monitor an amount of credit limit and credit terms with each customer.

In another embodiment, this invention provides threshold and limits which are embedded with certain nodes which provide various levels of alarms (colors, intensity, size, audible, etc.) as the limits and/or threshold are approached or exceeded. In a further embodiment, a tree can be formed by set manipulation operations, e.g. union, intersection, exclusive or, performed on a plurality of other trees.

In another embodiment, the nodes in a tree can be ordered. For instance, cash may be more important than marketable securities which may be more important than accounts receivable which may be more important than capital assets; order in this case is by liquidity. This ordering could enable the display or operation against a tree of only the most important items within the tree.

Figure 4:
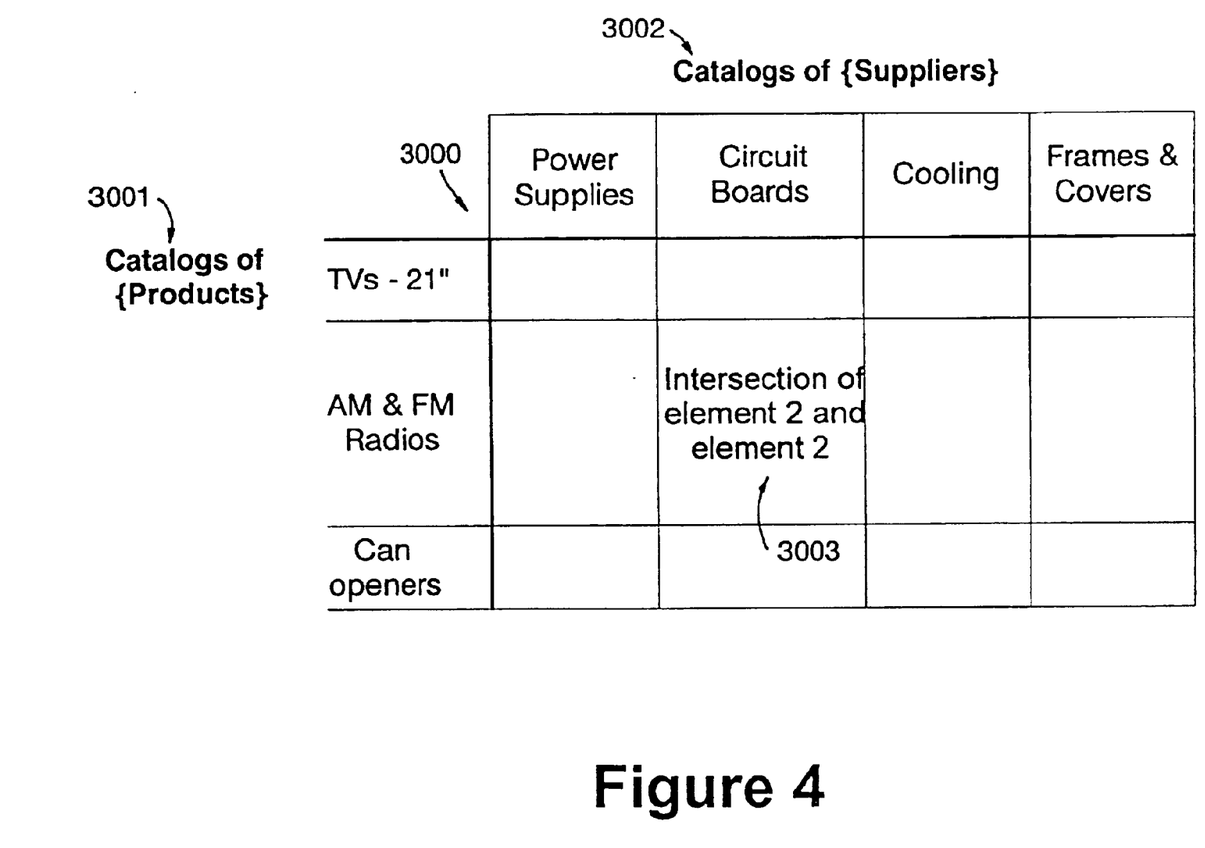
FIG. 4 illustrates a matrix method used to define or display information.
Figure 5:
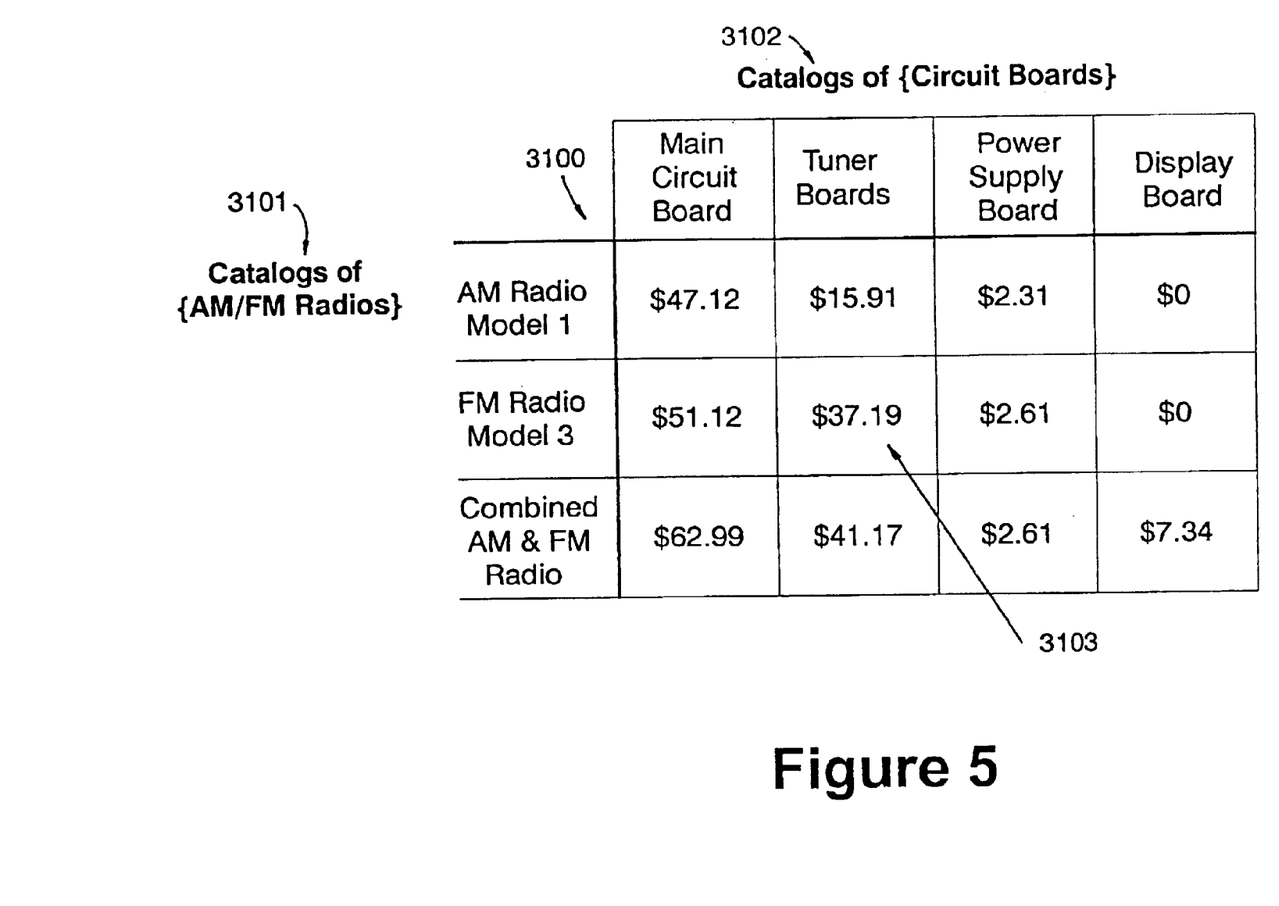
FIG. 5 shows a matrix expanded from a point of the matrix of FIG. 4.

One embodiment allows one to perform cost accounting processes by using embedded information with the matrix approach. FIG. 4 shows a matrix, 3000, containing cost accounting information for a catalog of elements of products, 3001, with a catalog of subsystems, 3002. If one activates the intersection, 3003, then one can cause the expansion of the catalog elements by selecting the intersection of two elements, 3003. Each catalog element can be expanded or not under the control of the user. In FIG. 5, the user chooses to expand each element, resulting in a new matrix 3100 with catalogs of elements 3101 and 3102. The intersection of two elements, if applicable, yields the cost, for example, 3103.

Additional modifications to matrix elements may provide and/or satisfy particular bookkeeping and/or accounting requirements, such as a list of customers/accounts, special requirements and/or obligations of customers/accounts; time scheduling, monitoring of time spent for customers/account; particular cost and charging information for each customer's/account; identification of responsible bookkeeping information provider of customer's/account; customer's/account's payroll data; account/customer data (sales, revenue and profit of each account); customer/account statistics; customer/account satisfaction failure rate and failure causes; customer/account payment information; ledger data; journal data; account information location: filenames and description, book location: volume, date, pages; etc.

Additional modifications are advantageously used to satisfy account requirements, such as matrix and/or element information for: a list of potential new accounts; information sources about new accounts; meeting attendees and scheduling with new account representatives; financial statistics and/or histogram of new and old accounts; accounts that are to be dropped and the date of dropping; special account features; industry statistics regarding new and old accounts; etc.

In a further embodiment similar matrix configurations and/or elements may be used to represent corporate and/or enterprise accounting firms. The matrix may include financial information broken down by: product line; division; geography; responsible entity; etc.

As will be understood by those of ordinary skill in the art, any suitable processor, computer or computer network may be used to carry out the present invention. For example, software for performing the needed operations may be embedded in a processor. Alternately, dedicated hardware may be used to perform the calculations.

Figure 6:
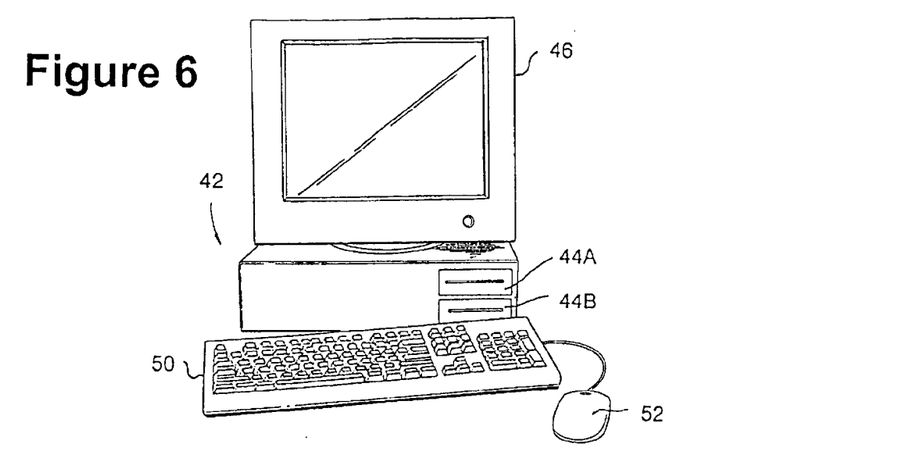
FIGS. 6 and 7 show a computer system that may be used in the invention.

A computer or computer network may also be used to perform the operations; and FIG. 6 illustrates, as an example, a computer of a type that may be used in the practice of this invention. Viewed externally in FIG. 6, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

Figure 7:
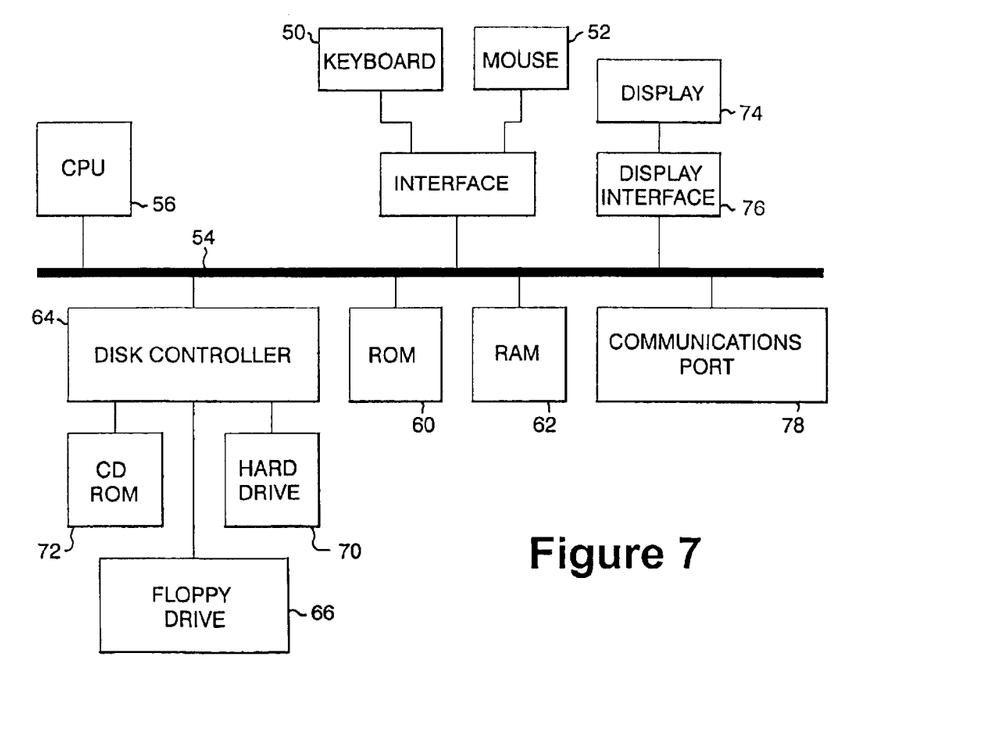

FIG. 7 shows a block diagram of the internal hardware of the computer of FIG. 6. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 8:
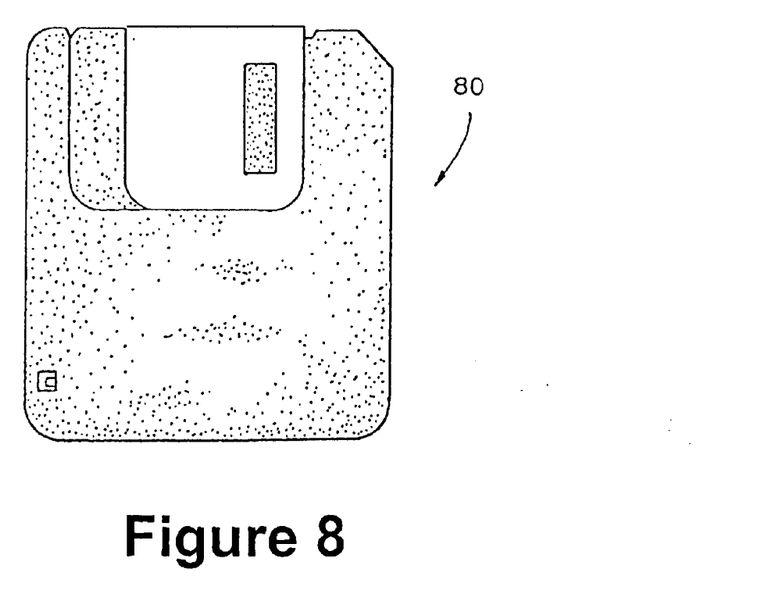
FIG. 8 illustrates a memory medium that can be used to hold a computer program for carrying out this invention.

FIG. 8 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

Figure 9:
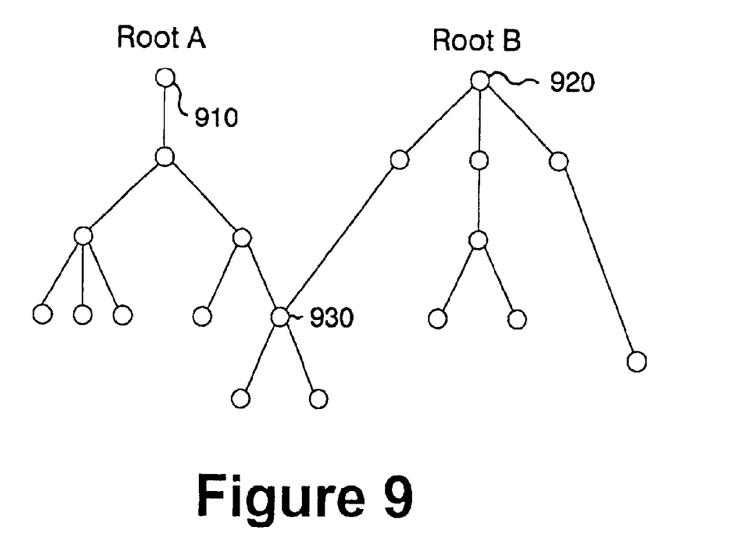
FIG. 9 shows an alternate tree display.

In some embodiments a tree may have more than one so called root node, as shown in FIG. 9. The elements/nodes emanating from each of the plurality of roots 910 and 920 may be common and be ultimately connected to each root at any subsequent tree level as appropriate to the application. Thus node 930 is shown to be ultimately connected to root-A 910 and root-B 920. An example of this occurs when root-A 910 represents corporate division-A and root-B represents corporate division-B, and node 930 represent the costs of a shared legal department.

Some embodiments provide for any combination of the following capabilities: matrix and/or element expansion; logical set manipulation of catalog elements to form changed and/or new matrices, changed and/or new elements, and/or changed and/or new catalogs; catalog manipulation an/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

While it is apparent that the invention herein disclosed is well calculated to fulfill the embodiments stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of providing multilevel information about aspects of accounting, comprising the steps:

generating on a computer display screen a display of a plurality of trees, each of the trees having a plurality of nodes;

embedding in the nodes of each of the trees multilevel information about a respective one of a plurality of accounting aspects;

embedding in some of the nodes, thresholds for providing levels of alarms as the thresholds are approached;

using a single computer to generate the display of the plurality of trees and to embed said information in said nodes; and using said some of the nodes to convey the alarms and to change the alarms as the thresholds are approached or exceeded.

2. A method according to claim 1 wherein the tree represents an aspect of accounting selected from the group comprising:

credit, debit, revenue, expense, credit plans, debit plans, credit thresholds, debit thresholds, assets, inventory costing and control, short term liabilities, long term liabilities, stockholders, working capital, cash flow, customer data, manufacturing costs, profit, and taxes and any combinations of these.

3. A method according to claim 1, wherein:

the trees are linkable and displayable with each other.

4. A method according to claim 1, wherein the embedded information is embedded in the form of matrices having columns and rows identifying relationship attributes.

5. A method according to claim 4, wherein the matrices include matrices selected from the group comprising:

a first set of matrices containing cost accounting information for a catalog of elements of products with a catalog of subsystems;

a second set of matrices providing particular bookkeeping and accounting requirements;

a third set of matrices representing corporate accounting firms; and any combination of these.

6. A method as recited in claim 1, wherein the step of generating includes displaying the tree in a top down form.

7. A method as recited in claim 1 wherein the step of generating includes generating a plurality of trees having at least one node being common to at least two of said plurality of trees.

8. A method as recited in claim 1, further comprising implementing at least one process taken from a group of processes including: matrix and/or element expansion; logical set manipulation of catalog elements to form changed and/or new matrices, changed and/or new elements, and/or changed and/or new catalogs; catalog manipulation and/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

9. A system for providing multilevel information about aspects of accounting, comprising:

a computer including a display screen; and a single computer application on the computer for i) generating on the computer display screen a display of a plurality of trees, each of the trees having a plurality of nodes; and ii) embedding in the nodes of each of the trees multilevel information about a respective one of a plurality of accounting aspects;

iii) embedding in some of the nodes, thresholds for providing levels of alarms as the thresholds are approached; and iv) using said some of the nodes to convey the alarms and to change the alarms as the thresholds are approached or exceeded.

10. A system according to claim 9, wherein the tree represents an aspect of accounting selected from the group comprising:

credit, debit, revenue, expense, credit plans, debit plans, credit thresholds, debit thresholds, assets, inventory costing and control, short term liabilities, long term liabilities, stockholders, working capital, cash flow, customer data, manufacturing costs, profit, and taxes and any combination of these.

11. A system according to claim 9, wherein:

the trees are linkable and displayable with each other.

12. A system according to claim 9, wherein the embedded information is embedded in the form of matrices having columns and rows identifying accounting attributes.

13. A system according to claim 12, wherein the matrices include matrices selected from the group comprising:

a first set of matrices containing cost accounting information for a catalog of elements of products with a catalog of subsystems;

a second set of matrices providing particular bookkeeping and accounting requirements; and a third set of matrices representing corporate accounting firms.

14. A program storage device readable by machine, tangibly embodying a program of instructions executable by the machine to perform method steps for displaying information about aspects of accounting, said method steps comprising:

generating on a computer display screen a display of a plurality of trees, each of the trees having a plurality of nodes;

embedding in the nodes of each of the trees information about a respective one of a plurality of accounting aspects;

embedding in some of the nodes, thresholds for providing levels of alarms as the thresholds are approached;

using a single computer application to generate the display of the plurality of trees and to embed said information in said nodes; and using said some of the nodes to convey the alarms and to change the alarms as the thresholds are approached or exceeded.

15. A program storage device according to claim 14, wherein the tree represents an aspect of accounting selected from the group comprising:

credit, debit, revenue, expense, credit plans, debit plans, credit thresholds, debit thresholds, assets, inventory costing and control, short term liabilities, long term liabilities, stockholders, working capital, cash flow, customer data, manufacturing costs, profit, and taxes and any combinations of these.

16. A program storage device according to claim 14, wherein:

the trees are linkable and displayable with each other.

17. A program storage device according to claim 14, wherein the embedded information is embedded in the form of matrices having columns and rows identifying accounting attributes.

18. A program storage device according to claim 17, wherein the matrices include matrices selected from the group comprising:

a first set of matrices containing cost accounting information for a catalog of elements of products with a catalog of subsystems;

a second set of matrices providing particular bookkeeping and accounting requirements; and a third set of matrices representing corporate accounting firms.

19. A method of providing multilevel information about aspects of accounting, comprising the steps:

generating on a computer display screen a display of a tree having a plurality of nodes;

embedding in the nodes multilevel information about said accounting aspects allowing multidirectional progression along a particular displayed tree; and embedding in some of the nodes, thresholds for providing levels of alarms as the thresholds are approached; and using said some of the nodes to convey the alarms and to change the alarms as the thresholds are approached or exceeded.

20. A method according to claim 19, further including displaying at least one attribute from a group of attributes consisting of: members of each of a plurality of particular accounting groups, group acknowledge and/or operational status, and any combination of these attributes.

21. A method according to claim 19, further including an aspects or attributes defining the display from a group of accounting aspects consisting of: a hierarchy of users privileges, a billing rate, a user location, a logical relationship, a network connection, and any combination of these aspects.

22. A method according to claim 19, said display showing an optionally selected partial tree representation of a particular aspect or attribute.

23. A method according to claim 19, wherein each tree node representation is denoted by a specific representation name.

24. A method according to claim 19, further comprising assigning capacities to nodes, trees and leaves from a capacity list consisting of: summing up tree billing rates; summing up rates going down the tree.

25. A method according to claim 19, wherein said tree represents a total capacity allocated to a multicast accounting group, and further comprising allocating to each first level branch a portion of said total capacity.

26. A method according to claim 19, further comprising said tree representing an accounting customer GÇÖs Web Site processing capacity; and displaying an allowable capacity of the total sets of web pages that said accounting customer wants as a tree of sets web pages.

27. A method according to claim 19, further comprising allowing manipulation of only a specified bottom portion of the tree.

28. A method according to claim 19, wherein each node is enclosed in a geometric shape, said geometric shape including specific accounting information about said each node.

29. A method according to claim 19, further comprising showing said specific accounting information in particular colors to visually denote said specific accounting information, employing intensity of each particular color to represent at least a part of said specific accounting information.

* * * * *